United States Patent [19]
Kang

[11] Patent Number: 6,061,468
[45] Date of Patent: *May 9, 2000

[54] METHOD FOR RECONSTRUCTING A THREE-DIMENSIONAL OBJECT FROM A CLOSED-LOOP SEQUENCE OF IMAGES TAKEN BY AN UNCALIBRATED CAMERA

[75] Inventor: Sing Bing Kang, Cambridge, Mass.

[73] Assignee: Compaq Computer Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/901,391

[22] Filed: Jul. 28, 1997

[51] Int. Cl.$^7$ ........................................................ G06K 9/00
[52] U.S. Cl. .......................... 382/154; 382/294; 382/296; 348/42
[58] Field of Search ..................................... 382/154, 284, 382/285, 294, 296; 348/42–48, 578, 584, 36, 37; 356/3, 8, 12; 345/419, 425

[56] References Cited

U.S. PATENT DOCUMENTS

| | | | |
|---|---|---|---|
| 5,155,775 | 10/1992 | Brown ..................................... | 382/153 |
| 5,611,000 | 3/1997 | Szeliski et al. ......................... | 382/294 |
| 5,724,435 | 3/1998 | Malzbender ............................ | 382/154 |
| 5,754,680 | 5/1998 | Sato et al. .............................. | 382/154 |
| 5,963,664 | 10/1999 | Kumar et al. ............................ | 382/154 |

OTHER PUBLICATIONS

Szeliski, R., "Shape from Rotation," Digital Equipment Corp. Cambridge Research Lab, CRL 90/13, Dec. 21, 1990. pp. 1–38.

Szeliski et al., "Recovering 3D Shape and Motion from Image Streams Using Nonlinear Least Squares," Journal of Visual Communication and Image Representation, vol. 5, No. 1, Mar., pp. 10–28, 1994.

Becker et al., "Semiautomatic 3–D Model Extraction from Unvalibrated 2–D Camera Views," Proceeding SPIE Visual Data Exploration and Analysis II, vol. 2410, pp. 447–461, San Jose, California, Feb. 8–10, 1995.

Matsumoto et al., "A Portable Three–Dimensional Digitizer," Proc. International Conf. On Recent Advances in 3–D Digital Imaging and Modeling, Ottowa, Canada, May 1997, IEEE, 1997, pp. 197–204.

Niem et al., Proc. International Conf. On Recent Advances in 3–D Digital Imaging and Modeling, Ottowa, Canada, May 1997, IEEE, 1997. pp. 173–180.

*Primary Examiner*—Bhavesh Mehta
*Attorney, Agent, or Firm*—Cesari and McKenna, LLP

[57] ABSTRACT

In a computerized method, the three-dimensional structure of an object is recovered from a closed-loop sequence of two-dimensional images taken by a camera undergoing some arbitrary motion. In one type of motion, the camera is held fixed, while the object completes a full 360° rotation about an arbitrary axis. Alternatively, the camera can make a complete rotation about the object. In the sequence of images, feature tracking points are selected using pair-wise image registration. Ellipses are fitted to the feature tracking points to estimate the tilt of the axis of rotation. A set of variables are set to fixed values while minimizing an image-based objective function to extract a set of first structure and motion parameters. Then the set of variables freed while minimizing of the objective function continues to extract a second set of structure and motion parameters that are substantially the same as the first set of structure and motion parameters.

16 Claims, 4 Drawing Sheets

METHOD FOR RECONSTRUCTING A THREE-DIMENSIONAL OBJECT FROM A CLOSED-LOOP SEQUENCE OF IMAGES TAKEN BY AN UNCALIBRATED CAMERA

FIELD OF THE INVENTION

The present invention relates generally to the field of image processing, and more particularly to reconstructing a three-dimensional objects from images taken of the object.

BACKGROUND OF THE INVENTION

In one computerized image processing application, the three-dimensional (3-D) shape of a structure can be recovered from a sequence of digitized images taken by a camera. Typically, one of the first steps taken prior to the actual 3-D reconstruction of an object is a process of camera calibration.

Therefore, particularly germane to 3-D reconstruction using an uncalibrated camera is self-calibration. Self-calibration refers to a recovery of camera parameters based only on correspondences of images taken at different object (or camera) poses. Most of the work done on self-calibration relies on knowing the motion of the camera (or object), such as pure translational motion, known camera rotation angles, and pure rotation about the center of the camera.

The traditional approach to 3-D reconstruction with multiple images using an uncalibrated camera applies affine and projective reconstruction techniques. The traditional approach to reconstruct scaled Euclidean structure is usually from known camera parameters.

For example, some techniques recover the Euclidean structure from structure rotation or equivalently, camera orbital motion under the assumption that the camera parameters and structure motion are known. Other techniques use a grided annulus pattern inside which the structure is placed. Camera parameters are extracted from the detected pattern, and the 3-D shape of the structure is recovered from silhouettes. Other known techniques use a closed-form solution for scaled Euclidean reconstruction with known intrinsic camera parameters but unknown extrinsic camera parameters. However, these techniques assume the existence of four coplanar correspondences that are not necessarily collinear.

Recently, 3-D scaled Euclidean structures have been reconstructed from images using an uncalibrated camera. For example, one method reconstructs a scaled Euclidean object under constant but unknown intrinsic camera parameters. There, a minimum of three images are required to recover a unique solution to the intrinsic camera parameters and the Euclidean structure.

The method is based on recovering an intermediate projective structure. Then, an optimization formulation that is based on the Frobenius norm of a matrix is applied. However, this is not equivalent to the more optimal metric of minimizing feature location errors in a 2-D image space. This method has been extended to show that scaled Euclidean reconstruction under a known image aspect ratio and skew, but varying and unknown focal length and principal point is also possible.

The assumption there is that the camera is undergoing general motion. It has been shown that it is not possible to reconstruct a scaled Euclidean structure under constrained motion such as pure translational or orbital motion.

In a two-step approach, a scaled Euclidean structure is recovered from a multiple image sequence with unknown but constant intrinsic parameters. The first stage involves affine camera parameter recovery using the so-called modulus constraint. This is followed in a second stage by conversion to scaled Euclidean structure. This approach can be extended to remove the assumption of a fixed camera focal length.

One known technique provides a method for camera self-calibration from several views. There a two-step approach is also used to recover a scaled Euclidean structure. The method first recovers projective structure before applying a heuristic search to extract the five intrinsic camera parameters. The heuristic involves iterating over several sets of initialization values and periodically checking for convergence.

A detailed characterization of critical motion sequences (CMS) has been given to account for ambiguities in reconstructing a 3-D structure. A critical motion sequence is a camera motion sequence that results in ambiguities in 3-D reconstruction when camera parameters are unknown. For example, only affine structures can be extracted from pure camera translational motion. Of particular relevance to the present disclosure is a determination that there is two degree of freedom projective ambiguity for orbital motions, i.e., pure rotation about a fixed arbitrary axis. In other words, it has been demonstrated that there exists a 2 degree-of-freedom ambiguity in scaled Euclidean reconstruction.

There are three possible options in recovering scaled Euclidean structure from orbital motion:

(1) fix two intrinsic camera parameters;

(2) impose structural constraints, e.g., orthogonality, parallelism, known 3-D locations of fiducial points; or (3) get the "best" reconstruction without (1) or (2) as disclosed herein.

SUMMARY OF THE INVENTION

The present invention provides a method for obtaining either a full or quasi-Euclidean reconstruction of an object from a specific sequence of images taken by an uncalibrated camera. In a closed-loop, the first image in the loop is positionally adjacent to the last image. The exact orientation of the camera with respect to the object is not necessarily known. In one specific type of closed-loop sequence, the object (or camera) undergoes a complete orbital motion. Here, orbital motion means a pure rotation about a fixed arbitrary axis. Alternatively, the camera could move in a rectangular manner around the object while taking the closed-loop sequence of images.

The present method by-passes the usual intermediate stages of projective or affine reconstruction to recover direct 3-D structure from feature point correspondences. The feature point correspondences are obtained from a two-stage bi-directional tracking process. 3-D reconstruction is done by applying the iterative Levenberg-Marquardt algorithm to minimize error between actual point tracks and projected point tracks.

Although a preferred embodiment of the invention describes the specific case involving complete orbital motion, the spirit of the invention involves closed-loop motion of any type. During initialization of the method, the tilt of the axis of, for example, rotation is estimated by fitting ellipses on feature point tracks, and assuming equal angular rotation between frames. The feature tracks are determined by registering adjacent images, followed by feature point selection, and locally tracking the feature points. Since the images are arranged in a closed-loop, the tracking can be performed bi-directionally.

Once the point features have been tracked, an objective function is minimized to extract structure and motion parameters. The minimization is first performed by holding estimated skew and aspect ratio parameters constant, and second by letting the parameters vary until the results of the first and second minimization converge. Convergence is accelerated by adopting an object-centered representation. Using a closed-loop sequence of images, the method yields superior results to those obtained for a partial sequence.

The 3-D structure can be recovered from a relatively sparse sequence of images where the camera intrinsic parameters, global camera tilt, local axis, amount of local movement between successive frames, and the 3-D positions associated with the tracked point features are all unknown. As an advantage of the method, the set-up is extremely simple using a camera, tripod stand, and a turntable. In addition, the global tilt angle, local rotation angles, and quasi-Euclidean structure can be extracted simultaneously. Furthermore, calibration of camera is not required. The key idea is the initialization of the method based on the type of motion. In contrast with prior art methods described above, recovery of intermediate affine or projective structure is not necessary. The method exhibits fast convergence and is stable.

DETAILED DESCRIPTION OF THE PREFERRED EMBODIMENT

System Overview

Figure 1:
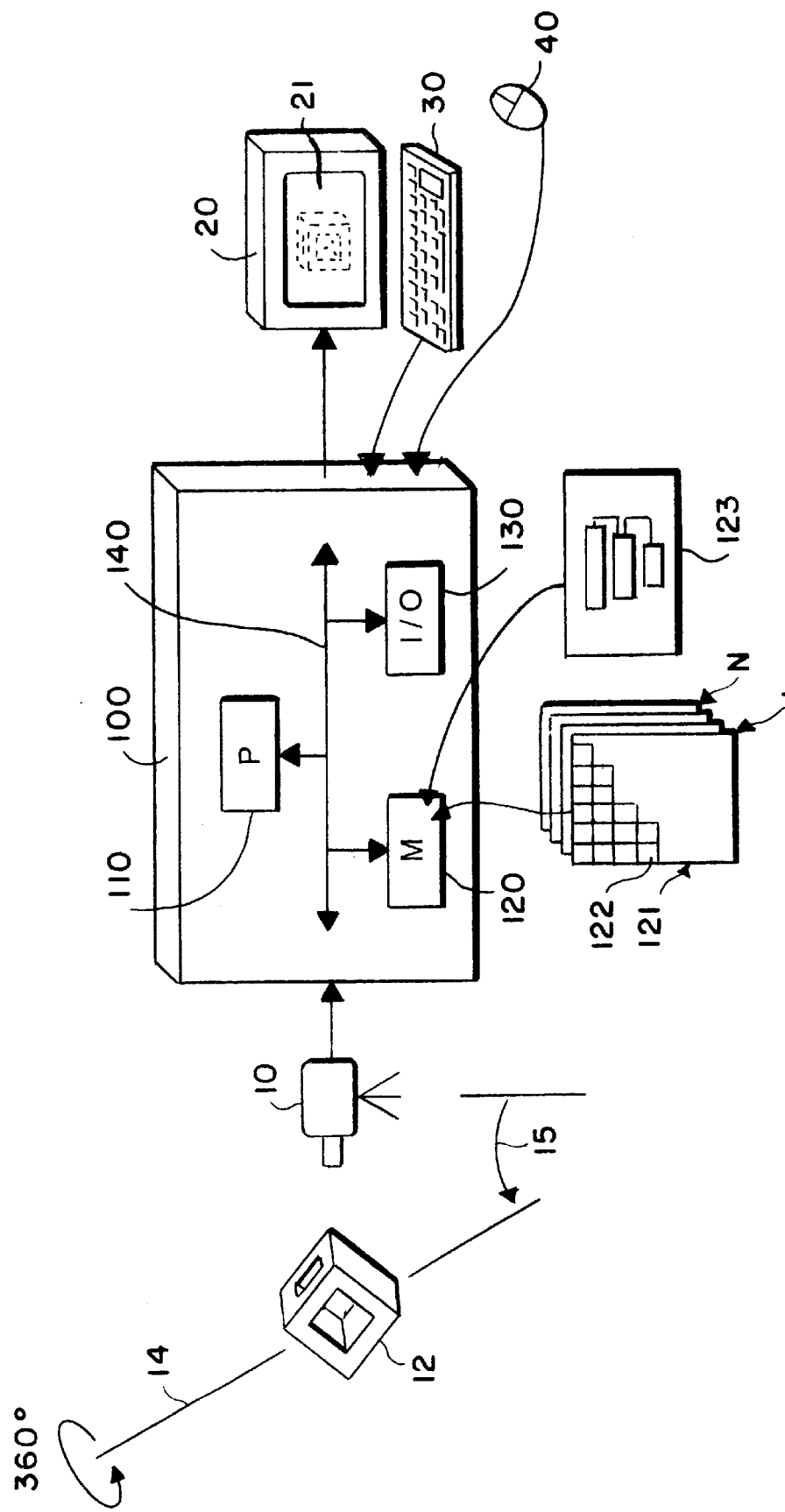
FIG. 1 is a block diagram of a system which uses the reconstruction method according to the invention.

FIG. 1 shows a computer system 100 connected to a camera 10, a display device 20, a keyboard 30, and a mouse 40. The system 100 includes one or more processors (P) 110, memories (M) 120, input/output interfaces (I/O) 130 connected to each other by bus lines 140.

During operation of the system 100, a three-dimensional (3-D) structure 12 makes a complete orbital motion, e.g., at least 360°. Herein, orbital motion means pure rotation about a fixed arbitrary axis 14. The angle of tilt 15 of the axis 14 with respect to the camera 10 is unknown. The structure 12 has sufficient surface texture to permit inter-frame feature tracking. Although the preferred embodiment is described using orbital motion, the invention can also be worked using other types of closed-loop motion.

While the structure 12 is rotating, the camera 10 measures light intensity and/or color values of the surface features as a closed-loop sequence of images. A closed-loop is defined herein as a sequence of images where the first and last image in the sequence are positionally adjacent. The camera 10 does not have significant radial distortion, or the radial distortion factor is known so that the images can first be corrected. Each image is an instantaneous planar (2-D) view of the structure 12. Typically, there are about 30 to 50 images in a sequence, that is, the sequence is relatively sparse. For some objects, the 3-D structure can be recovered from fewer frames. In general, better results are obtained for a larger number of frames.

The sequence of images are stored in the memories 120 of the system 100 as digitized frames 121. The first frame 1 is taken at a pose which is positionally adjacent to the last frame N. Typically, each frame 121 includes a plurality of pixels 122 arranged in a regular pattern. The pixels 122 encode the measured light intensity/color values representative of the structure 14 at fixed angular poses. It should be noted that the same effect can be achieved by moving the camera 10 in a completely arbitrary orbital motion about a stationary structure. Other types of closed-loop motions are also possible.

Computerized processes 123, described in greater detail below, are also stored in the memories 120 as instructions and data of software programs written in, for example, the C language. The programs operate under the control of an operating system, for example, UNIX.

The instructions of the programs manipulate the pixel data of the frames 121 to perform a quasi-Euclidean (3-D) reconstruction of the object from the 2-D frames. A quasi-Euclidean reconstruction is close to, but not necessarily an exact scaled Euclidean construction. An exact scaled Euclidean reconstruction is not possible because of the 2 degree-of-freedom ambiguity inherent in orbital motion, as stated in the background section. Euclidean reconstruction would be possible in the case of general camera motion.

The 3-D shape of the structure 12 can be recovered from the relatively sparse sequence of images even though the camera intrinsic parameters, global camera tilt, local rotation axis, amount of local rotation between successive frames, and the 3-D positions associated with the tracked surface point features are all unknown.

A reconstructed 3-D object 21 can be viewed on the display device 20 by user commands initiated by the keyboard 30 and/or mouse 40. Because the 3-D shape is substantially recovered, the reconstructed object 21 can be viewed from any angle, even though the object was imaged with a fixed camera location, or in the case where the camera moves orbitally, the object is held in a fixed position.

Initialization of the preferred method is based on estimating the tilt 15 of the axis 14. In the case of orbital motion, the angle of tilt can be determined by fitting ellipses on feature point tracks. In addition, as an initial estimation, equal angular rotation between frames is first assumed. Then, bypassing the usual intermediate stages of projective or affine reconstruction as in the prior art, the method recovers 3-D structure directly from feature point correspondences obtained from a two-stage bi-directional tracking process. The 3-D reconstruction as disclosed herein is done by applying the iterative Levenberg-Marquardt algorithm to minimize error between actual point tracks and projected point tracks. Convergence is accelerated by adopting an object-centered representation.

Global Image Registration and Local Bi-Directional Feature Tracking

Figure 2:
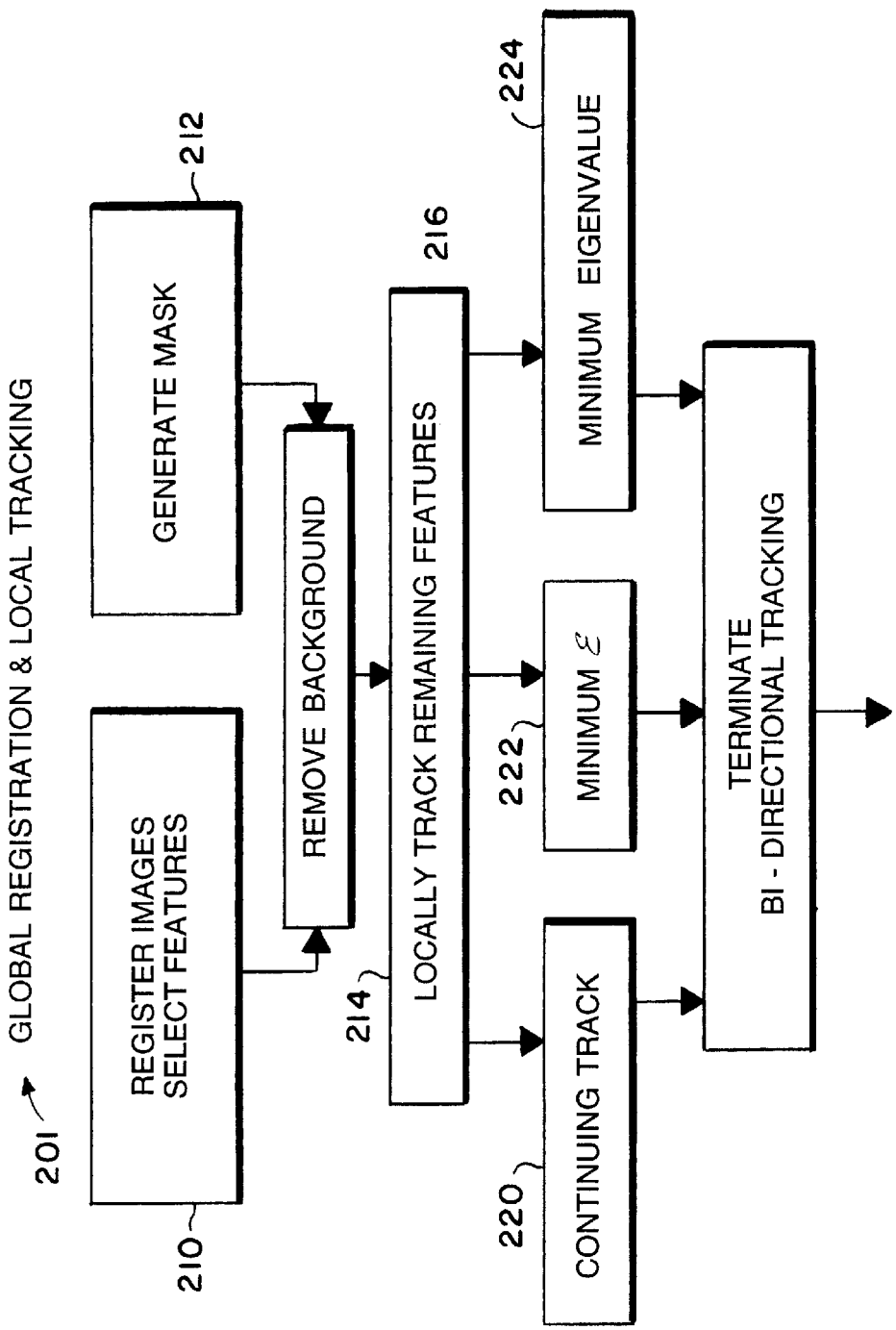
FIG. 2 is a flow diagram of global image registration and local feature tracking processes.

During initialization 201 as shown in FIG. 2, global image registration and local feature tracking are performed. Adjacent images are first registered in step 210. Image registration 210 determines the general image (optical) flow between successive frames in the sequence. Image registration compares at least two images to discern features (represented by pixel values) that are similar and different between the images.

Preferably, a pair-wise spline-based registration technique as described in U.S. Pat. No. 5,611,000 "Spline-Based Image Registration" issued to Szeliski, et al. on 23 Mar. 11, 1997 is used. In the spline-based technique, the image flow can generally be represented with a relatively small number of spline control nodes or vertices compared with the number of pixels. For each frame, feature points with high local texture, as indicated by their minimum eigenvalue of the local Hessian, are automatically selected for feature tracking.

Concurrently, a background mask is generated in step 212. The mask is used in step 214 to remove regions that do not change significantly in light intensity values. This is effective in removing a static background and low structure texture areas. After masking, the remaining features are locally tracked in step 216.

The tracking proceeds by way of bi-directional tracking. Bi-directional tracking involves comparing a frame with both adjacent frames. The selected feature points in each frame are individually and locally tracked using the flow estimates from the image registration step 210.

Here, the local tracking takes place independently in both (forward and backward) directions over multiple frames of the closed-loop. Because the frames form a closed-loop, every frame will have two adjacent frames. Multi-frame local tracking can be performed as described by Shi et al, in "Good Features to Track" IEEE Computer Society Conference on Computer Vision and Pattern Recognition," pp. 593–600, June 1994.

These steps incorporate the advantages of both global spline-based registration and local tracking techniques. Although the global spline-based registration technique is able to track relatively significant motion, it is not able to deal with motion discontinuity very well due to its implicit smoothness constraint. On the other hand, the local tracking technique performs very poorly for significant motion but very well within the vicinity of the true track position.

In addition, because surface feature points of the structure 12 are tracked independently for local tracking, motion discontinuities resulting from the sparse sequence of images are handled correctly. Also, because the spline-based registration technique yields a reasonably good estimate of motion, the local tracking technique can then make use of this estimate to improve on the new track image position, especially when the feature position is within the vicinity of a motion discontinuity. By combining the methods as disclosed herein, better results can be obtained.

Tracking Termination

The tracking stops when any one of the following termination conditions occurs: each track continuously moves in one direction (220), the RMS pixel difference error ($\epsilon$) is less than a predetermined threshold (222), for example, fifteen, or the minimum eigenvalue is above a predetermined threshold (224), for example five-hundred.

The problem with the first termination condition is that a complete track for some selected points may not be possible because the points may not be observable in all the frames due to occlusions. However, the need to reject random noise is greater. Having a few more redundant points is a relatively small price to pay to reduce errors due to random noise. The tracks are post-processed to remove tracks that are deemed too short, for example, a minimum track length of 3 (image frames) can be imposed.

Tilt and Motion Determination

Figure 3:
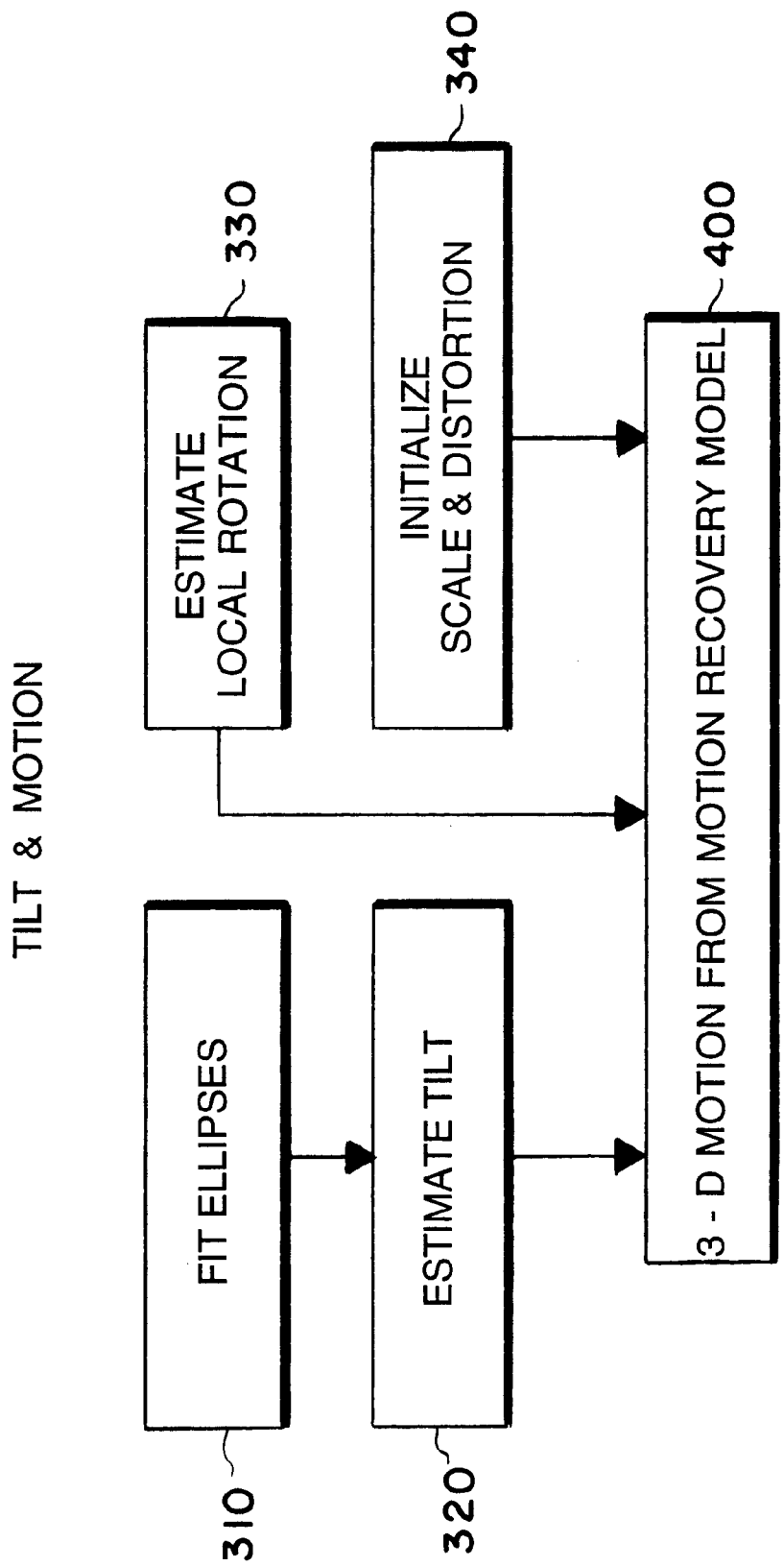
FIG. 3 is a flow diagram of tilt and motion estimation processes.

Next, as shown in FIG. 3, tilt and motion are determined. In step 310, ellipses are fitted to the tracks determined above. From the orientation and shape of the ellipses, the tilt can be estimated. The estimated tilt, based on experimental results, is usually within 15° of the actual tilt.

The initialization of structure from motion recovery model for each frame 121 is made simpler by the fact that the motion of the structure 14 is, for example, a rotation about a unique, although unknown axis 14. If the camera 10 measures N images in the closed-loop sequence, then the local rotation angle about the z-axis 14 associated with image j is initialized to 360° j/N in step 330. Errors in local motion estimates can be corrected as the images are further processed.

The camera factor and perspective distortion factor are initialized to values 1.0 and 0.001 respectively in step 340. Changes in these two values up to about an order of magnitude are well tolerated.

General 3-D Structure Recovery From Motion

According to the preferred embodiment of the invention, the three-dimensional shape of the object 12 involves the recovery of a set of 3-D structure parameters $p_i$, and time-varying motion parameters $T_j$ from a set of measured image features $u_{ij}$ as represented by the measured light intensity values, e.g., the pixels 122. A general formulation for linking 2-D image feature location $u_{ij}$ of a frame j to its 3-D position $p_i$, where i is the track index, is:

$$u_{ij}=P(T_j^{(k)} \ldots T_j^{(1)} p_i) \qquad [\text{Eq 1}]$$

where the perspective projection transformation P( ) is applied to a cascaded series of rigid transformation $T_j^{(k)}$. Each transformation in turn can be defined by:

$$T_j^{(k)} x = R_j^{(k)} x + t_j^{(k)} \qquad [\text{Eq 2}]$$

where R represents a rotation matrix and t is a translation applied after the rotation.

Within each of the cascaded transforms, the motion parameters may be time-varying (the j subscript is present) or fixed (the subscript is dropped). In the preferred embodiment of the invention, the transformation associated with the (horizontal) orbital motion can be expressed as:

$$u_{ij}=P(R_{x,\tau}R_{z,\theta}p_i+t) \qquad [\text{Eq 3}]$$

where $R_{x,\tau}$, $R_{z,\theta}$ represent rotation about the x-axis by $\tau$, and about the z-axis by $\theta$ respectively. It is assumed that there is negligible cyclotorsion, i.e., rotation of the camera 10 about the viewing axis.

The general camera-centered perspective projection equation can be formulated as:

$$\begin{pmatrix} u \\ v \end{pmatrix} = P \begin{pmatrix} x \\ y \\ z \end{pmatrix} \equiv \begin{pmatrix} \dfrac{sx + \eta \sigma y}{1 + \eta z} + u_0 \\ \dfrac{rsy}{1 + \eta z} + v_0 \end{pmatrix} \qquad [\text{Eq 4}]$$

where s is the scale factor of the camera 10, r is the image aspect ratio, $\sigma$ is the image skew, $\eta$ is the perspective distortion factor, and $(u_0, v_0)$ is the principal point in the image. The principle point is where the optical axis of the camera intersects the image plane.

Least-squares Minimization

The well known Levenberg-Marquardt algorithm can be used to solve for the structure and motion parameters. The merit or objective function to be minimized is:

$$C(a) = \sum_i \sum_j c_{i,j} |u_{i,j} - f(a_{i,j})|^2 \qquad [\text{Eq 5}]$$

where f( ) is given in Eq 1, and $a_{ij}$ consists of the unknown camera motion and the object structure parameters as given by:

$$a_{ij}=(p_i^T, m_j^T, m_g^T)^T \qquad [\text{Eq 6}]$$

The vector $a_{ij}$ contains all of the unknown structure and motion parameters, including the 3-D points $p_i$, the timedependent motion parameters $m_j$, and the global motion/calibration parameters $m_g$. The weight $c_{ij}$ in Eq 6 describes the confidence in the measured pixel values $u_{ij}$, and is normally set to the inverse variance $\sigma_{ij}^{-2}$.

Two-stage Approach

It is well known that there is a 2 degree-of-freedom ambiguity in scaled Euclidean reconstruction for orbital motion. A simplistic solution would set two of the intrinsic camera parameters to a constant, either as an assumption, or through camera calibration. A good choice, perhaps, would be to fix the image skew factor $\sigma$ to 0, and the aspect ratio r to 1. However, in order to obtain better results, here the parameters are kept unknown.

Figure 4:
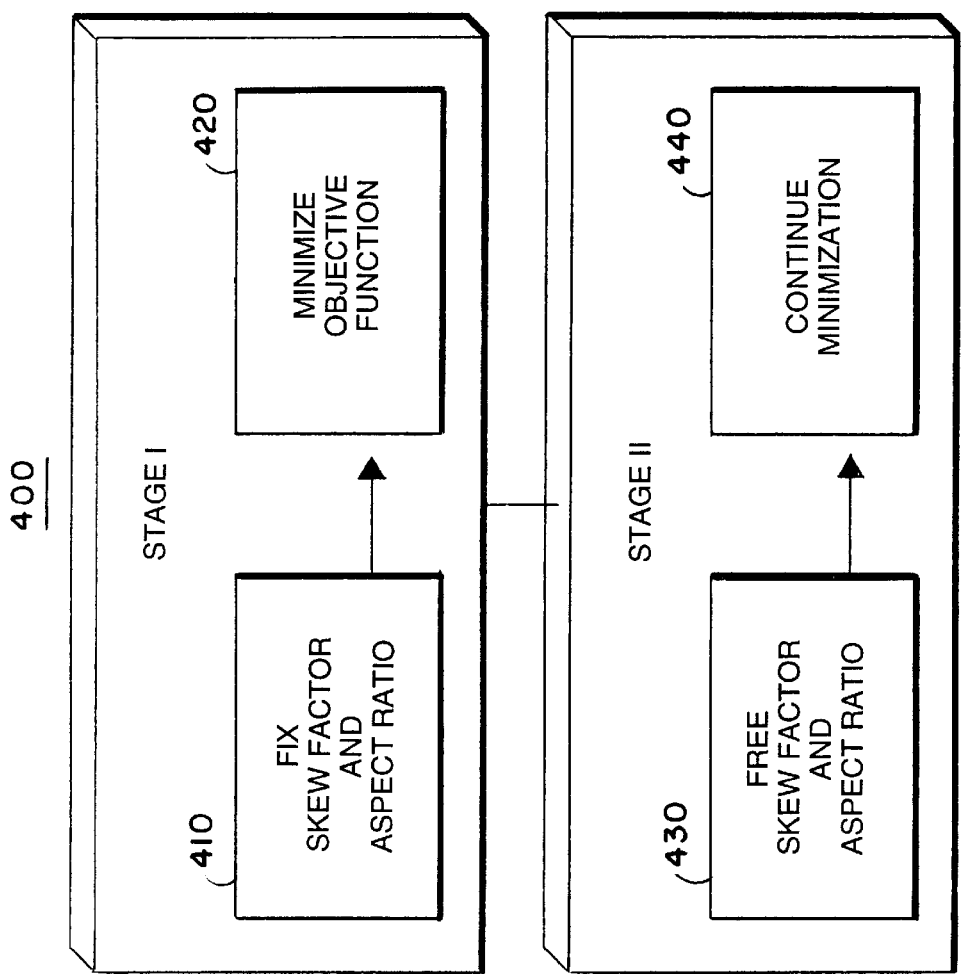
FIG. 4 is a flow diagram of a process to minimize an objective function.

As shown in FIG. 4, the preferred embodiment of the invention uses a two-stage 400 approach to acquire the quasi-Euclidean structure.

First Stage

In step 410 of the first stage, fix the skew and the principle point to a constant value, e.g., $\sigma=u_0=v_0=0$. The aspect ratio r is held constant at 1. Subsequently, apply the Levenberg-Marquardt algorithm in step 420 until terminating conditions are met. The termination conditions are either: the number of iterations exceeds a threshold, for example 150, or the improvement in the objective function is too small ($10^{-6}$), whichever comes first.

Second Stage

In step 430 of stage 2, let the parameters $\sigma$, $u_0$, $v_0$, and r vary, and continue with the Levenberg-Marquardt algorithm 340, with the iteration number reset to 0, until the same termination conditions are again met.

In general, using this two-stage approach results in better convergence towards lower image projection errors and better structure and motion recovery.

As an advantage, a closed-loop sequence of images, where the first and last frames are positionally adjacent, yields a better reconstruction of the structure due to the extra constraints for feature points between the adjacent frames and their vicinities. If an incomplete rotation is used, as in most prior art methods, the errors in estimating the rotation angles are all biased in one direction due to the single "open" chain of constraints, causing a pinched appearance. In comparison, the reconstructed 3-D points of the same structure under complete rotation do not result in the same pinched appearance.

Note that in the case of general closed-loop camera motion, the first stage may be unnecessary. This is because there is no ambiguity in Euclidean reconstruction for arbitrary motion, in contrast with the two degrees of freedom ambiguity for orbital motion.

Summary

Despite reconstruction ambiguities that exist for orbital motion, experimental results for synthetic and real 3-D structures show that reasonable quasi-Euclidean reconstruction can be done. This is because in practice, the camera intrinsic parameters of the principal point ($u_0$, $v_0$), image skew $\sigma$, and aspect ratio r do not usually deviate significantly from normally assumed values of (0, 0), 0, and 1 respectively.

The preferred method operates according to a preference of maximizing knowledge of the camera to directly reconstructing 3-D shape, rather than converting to intermediate projective or affine representations of the structure. With a complete rotation of the structure, or an equivalent complete camera orbital motion which spans a full 360°, better results can be obtained. The better results are due to the additional constraints available in connection with the point tracks that bridges the first and last frames of the closed loop image sequence.

Described is a completely automatic method of recovering quasi-Euclidean structure from an unknown object by complete object structure rotation, or equivalently, camera orbital motion. The preferred method starts with two-stage bi-directional tracking, followed by the application of iterative Levenberg-Marquardt minimization of feature point error to recover structure and rotational motion simultaneously. Apart from the knowledge that the images form a closed-loop, no other camera parameters are known.

The method minimizes the error between the projected image feature position and measured feature position directly and locally. In contrast with prior art techniques, no intermediate affine or projective reconstruction is done. The method usually converges toward the correct solution due to the assumption of complete structure rotation, which simplifies initialization. In addition, because the motion is rotational, a good initial estimate of the camera tilt can be made by fitting ellipses on the recovered tracks.

Having described a preferred embodiment of the invention, it will now become apparent to one skilled in the art that other embodiments incorporating its concepts may be used. It is felt therefore, that this embodiment should not be limited to the disclosed embodiment, but rather should be limited only by the spirit and the scope of the appended claims.

I claim:

1. A computerized method for performing a Euclidean reconstruction of an unknown three-dimensional (3-D) structure from a sequence of two-dimensional (2-D) images of the structure, the 3-D structure undergoing closed loop motion relative to the camera, the method comprising the steps of:

generating a closed-loop sequence of 2-D images of the unknown 3-D structure with an uncalibrated camera;

forming at least one set of consecutive 2-D images in the closed-loop sequence;

selecting feature tracking points captured from the unknown 3-D structure in the at least one set of 2-D images and determining a progression of one or more feature tracking points in the images of the at least one set;

estimating the relative orientation between the unknown 3-D structure and the camera with the progression of the feature tracking points;

fixing a set of parameters while minimizing an objective function to extract a set of first structure and motion parameters of the unknown 3-D structure; and varying the set of parameters while minimizing the objective function to extract a set of second structure and motion parameters of the unknown 3-D structure until the set of second structure and motion parameters are substantially identical to the set of first structure and motion parameters.

2. The method of claim 1 wherein the closed-loop sequence of images is sparse.

3. The method of claim 2 wherein the closed-loop sequence of images includes less than fifty images.

4. The method of claim 1 wherein intrinsic parameters of the camera are unknown.

5. The method of claim 1 wherein a relative displacement between successive images of the closed-loop sequence is unknown.

6. The method of claim 1 further including the step of estimating a local rotation angle from the number of images in the closed-loop sequence.

7. The method of claim 1 further including the step of masking static features in the closed-loop sequence of images.

8. The method of claim 1 further including the steps of:

registering adjacent pairs of images in the closed-loop sequence of images; and selecting the feature tracking points from the registered images.

9. The method of claim 8 wherein the image registration is spline-based.

10. The method of claim 1 wherein the selected feature tracking points are locally tracked until a termination condition is met.

11. The method of claim 1 wherein minimizing the objective function includes applying iterative Levenberg-Marquardt algorithm.

12. The method of claim 1 wherein the closed-loop sequence of images is measured while the structure undergoes a complete orbital motion.

13. The method of claim 12 wherein the axis of rotation with respect to the camera is unknown.

14. The method of 13 wherein ellipses are fitted to the selected feature tracking points.

15. The method of claim 14 wherein the angle of tilt of the axis of rotation is estimated from the orientation and shape of the fitted ellipses.

16. The method of claim 1 wherein a first and last images measured in the sequence are positionally adjacent to form the closed-loop.

* * * * *